Sept. 27, 1938.   E. H. McKAY   2,131,450
CEREAL FOOD PROCESS
Filed Dec. 18, 1936
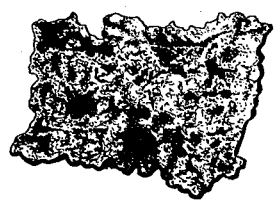
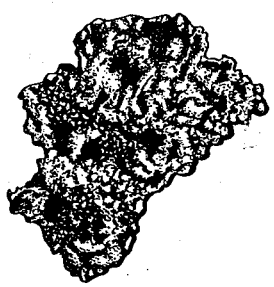
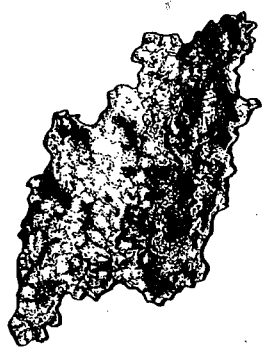
Inventor:
Eugene H. McKay.
By Ames, Phiess, Olson & Mecklenburger
Attys.

Patented Sept. 27, 1938

2,131,450

UNITED STATES PATENT OFFICE 2,131,450

CEREAL FOOD PROCESS

Eugene H. McKay, Battle Creek, Mich., assignor to Kellogg Company, Battle Creek, Mich., a corporation of Delaware Application December 18, 1936, Serial No. 116,463

3 Claims. (Cl. 99—81)

This invention relates to a process for making a new form of ready-to-eat cereal food and also to the product produced by such process.

The principal object of the invention is to provide a ready-to-eat flaked cereal food product in which the flakes are not only much larger than those produced in the usual way, that is, from single grains or kernels, but also to provide flakes which are much more frangible and appetizing than the usual flaked cereal product and which have a particularly pleasing taste and eye appeal.

While the invention has reference to the provision of improved flaked cereal foods generally, it relates more particularly to a ready-to-eat cereal food of the flaked variety made from wheat or rice.

The large flakes are produced by welding together under pressure a number of kernels of grain. Thus each flake consists of a homogeneous mass of flattened kernels in which the identity of the individual kernels is lost and the flakes have a more blistered or puffed and fibrous character after toasting than the usual flakes.

In the accompanying drawing I have shown in a general way and on a somewhat enlarged scale the form taken by the final product when whole wheat is used as the starting cereal, several pieces or fragments being shown. No exact showing of the fragments can be made owing to variations in the size of the fragments and differences in the puffs resulting from toasting. The drawing merely gives the general idea of the form of the final product and illustrates in a general way the puffs or blisters appearing on the finished flakes.

The following is a description of the process for illustrative purposes, assuming the starting material to be whole wheat. Whole wheat in the amount of, say, 100 pounds, which is thoroughly cleaned by washing, etc., and containing about 24 per cent of moisture at this stage, is drained and then dried in a vat by means of cool air for about ten minutes, or to a moisture content of about 20 per cent. The wheat is then tempered for about eight hours, at the end of which tempering step the moisture content is about 19 per cent.

The wheat is then steamed in a suitable container for about three minutes or until the moisture content increases to about 22 per cent. After this steaming step the wheat is tempered for about one hour, after which it is run through a flaking mill where it is preferably "bumped", that is, slightly flattened, although the kernels of wheat may be flattened or flaked to any desired degree in this step of the process.

The bumped or flattened kernels of wheat are then cooked, as in a rotary cooker, for, say, one hour at about seventeen pounds steam pressure. At the end of this cooking step the moisture of the wheat has increased to about 34 per cent, due to the condensate of the cooker, and the kernels are soft and pliable or of a somewhat tough dough-like texture. From the cooker the kernels of wheat are at once, that is, while still moist and hot, rapidly run through a flaking mill in a mass, emerging from the mill in the form of a thin sheet of a thickness of, say, from about .004 to .008 inch.

The sheet, as it emerges from the mill, may be broken up into large pieces of varying sizes, although this is not necessary.

The large fragments or pieces are then dried in a suitable vat to about 9 per cent moisture when they are hard and brittle, the moisture content being somewhat below air dry. They are then run through a breaking machine to reduce the pieces to smaller fragments of, say, about one-half inch to one inch, or somewhat smaller in area than as shown in the drawing. The dried fragments, each of which consists of a homogeneous mass of individual kernels, are then flavored with 9 per cent of sugar in an aqueous solution at the rate of about three gallons of flavor to 100 pounds of the fragments of wheat. The sugar flavored fragments of wheat are then dried again to fix or set the sugar, after which they are tempered for, say, eighteen hours, at the end of which time they have a moisture content of about 10 per cent and are again reduced to a hard and brittle condition.

In this shape the fragments are toasted and browned in any suitable form of toasting oven. During this oven treatment the fragments puff up to greatly increased size. After the puffing and toasting operation the fragments are subjected to a salting treatment. Salt in solution in the amount of, say, 1.25 per cent is preferably sprayed on to the fragments, after which the fragments are thoroughly dried and are then ready for packing.

Treating the whole wheat product with salt in the manner described, that is, after the completion of all heat treatment, results in the salt impregnating the superficial surfaces of the fragments without, however, penetrating into the interior or body of the fragments. The result is that the product has a far greater freedom from tendency to become rancid than cereal foods in which the salt is cooked with the grain in the ordinary manner.

The product of the invention possesses excellent eating qualities and retains its crispness over substantial periods. The eating qualities together with the form and texture are substantially better than those of any whole wheat product now available to the public.

It is apparent that all the nutritive qualities of the entire wheat kernel are retained in the finished product and that it is not only highly frangible and crisp but also retains its crispness not only while in stock but also when prepared for eating with milk or cream.

While I have described the invention more particularly in connection with the processing of wheat, other cereal grains, such, for example, as rice, may by its use be converted into flaked products of similar form and characteristics.

Thus, in the case of rice, 100 pounds of such cereal are cooked in a rotary cooker with three and one-half gallons of water, eight pounds of sugar and two and one-half pounds of salt. Cooking is continued for, say, one and three-fourths hour at seventeen pounds steam pressure, or until all the kernels of rice are readily separated when cooled.

The cooked rice is then dried, preferably on a traveling dryer, to a moisture content of about 30 per cent. The rice is then placed in a tempering bin where it is held for approximately twenty to twenty-four hours. The rice is then run through a separator for separating the individual kernels, after which they are fed to a smooth-surface flaking mill in a mass and at a rapid rate, so that the separate kernels are welded together in passing through the mill and issue therefrom in the form of a continuous, smooth-surface sheet of rice. The sheet at this stage of the process may be from, say, .004 to .008 inch in thickness.

The continuous sheet of rice may be broken up into large fragments or pieces, which are then dried until reduced to a moisture content of about 10 to 12 per cent or until the fragments are hard and brittle. After this the large fragments are broken up into smaller fragments of any desired area, as, for example, one-half to one inch square, roughly. The dry fragments are then tempered and run through a suitable toasting oven, where the product is puffed to greatly increased size and becomes brown and crisp. The finished product has a moisture content of approximately 2 per cent, and when cool is ready for packing.

I claim:

1. A process for making a ready-to-eat cereal food product, comprising steaming wheat until it contains about 22% moisture, flattening the kernels of wheat, cooking the same, running the wheat kernels while moist and hot rapidly through a flaking mill to form the same into a thin sheet, drying the sheeted wheat until it is hard and brittle, breaking it into fragments, flavoring the fragments with sugar, toasting the fragments to puff them to greatly increased size, spraying the toasted fragments with a salt solution, and drying the fragments to evaporate the solvent.

2. A process for making a ready-to-eat cereal food product, comprising steaming kernels of cereal grains, flattening the steamed kernels, cooking the flattened kernels, rolling the cooked kernels into a sheet, drying the sheet until hard and brittle, breaking the sheet into fragments, and subjecting the fragments to heat to puff them to greatly increased size.

3. A process for making a ready-to-eat cereal food product, comprising steaming wheat kernels for about three minutes, slightly flattening the steamed kernels, cooking the flattened kernels of wheat, rolling the kernels into a thin sheet in which the individuality of the kernels is lost, drying the sheet until it is hard and brittle, breaking the sheet into fragments, subjecting the fragments to heat to puff them to greatly increased size, applying a salt solution to the toasted fragments, and drying the fragments to evaporate the solvent.

EUGENE H. McKAY.